(12) United States Patent
Abe et al.

(10) Patent No.: US 7,455,935 B2
(45) Date of Patent: Nov. 25, 2008

(54) ION-CONDUCTIVE ELECTROLYTE AND CELL EMPLOYING THE SAME

(75) Inventors: Toshihiro Abe, Suita (JP); Shoji Saibara, Suita (JP); Hideaki Katayama, Takatsuki (JP); Shigeo Aoyama, Otsu (JP); Keigo Aoi, Nagoya (JP); Makito Yokoe, Nagoya (JP); Masahiko Okada, Kasugai (JP)

(73) Assignee: Hitachi Maxell, Ltd., Osaka (JP)

( * ) Notice: Subject to any disclaimer, the term of this patent is extended or adjusted under 35 U.S.C. 154(b) by 1050 days.

(21) Appl. No.: 10/492,728

(22) PCT Filed: Apr. 14, 2003

(86) PCT No.: PCT/JP03/04676

§ 371 (c)(1),
(2), (4) Date: Apr. 15, 2004

(87) PCT Pub. No.: WO03/088272

PCT Pub. Date: Oct. 23, 2003

(65) Prior Publication Data

US 2004/0241553 A1    Dec. 2, 2004

(30) Foreign Application Priority Data

Apr. 15, 2002  (JP) .............................. 2002-112036
Dec. 16, 2002  (JP) .............................. 2002-363185

(51) Int. Cl.
  $H01M\ 6/16$  (2006.01)
  $H01M\ 6/18$  (2006.01)
(52) U.S. Cl. ........................................ 429/337; 429/317
(58) Field of Classification Search .................. None
  See application file for complete search history.

(56) References Cited

U.S. PATENT DOCUMENTS 6,143,443 A    11/2000    Kazacos et al.

FOREIGN PATENT DOCUMENTS

| JP | 61-83249 | 4/1986 |
|---|---|---|
| JP | 62-30147 | 2/1987 |
| JP | 2-34660 | 2/1990 |
| JP | 6-29043 | 2/1994 |
| JP | 8-217872 | 8/1996 |
| JP | 10-223041 | 8/1998 |
| JP | 2002-343381 | 11/2002 |
| JP | 2003-217340 | 7/2003 |

OTHER PUBLICATIONS

Kricheldorf et al; Polymers of carbonic acid. 22. Cholesteric polycarbonates derived from (S)-((2-Methylbutyl)thio)hydroquinone or isosobide; Nov. 1, 1996; Macromolecules; 29(25), 8077-8082.*
Okada et al; Biodegradable polymers based on renewable resources. VI. synthesis and biodegradability of poly(ester carbonate)s containing 1,4:3,6-dianhydro-D-glucitol and sebacic acid units; 2002; Journal of Applied Polymer Science; 86(4), 872-880.*
esp@cenet database, English Abstract of Patent No. JP2034660, Publication Date: Feb. 5, 1990, 1 page.
Partial translation of Japanese Application JP61-83249, 3 pages.
esp@cenet database, English Abstract for Japanese Patent No. JP62030147, Publication Date: Feb. 9, 1987, 1 page.
Atsushi Nishimoto, et al., "High Ionic Conductivity of Polyether-Based Network Polymer Electrolytes with Hyperbranched Side Chains", Macromolecules 1999, vol. 32, pp. 1541-1548.
esp@cenet database, English Abstract for Japanese Patent No. JP10223041, Publication Date: Aug. 21, 1998, 1 page.
esp@cenet database, English Abstract for Japanese Patent No. JP8217872, Publication Date: Aug. 27, 1996, 1 page.
esp@cenet database, English Abstract for Japanese Patent No. JP6029043, Publication Date: Feb. 4, 1994, 1 page.
esp@cenet database, English Abstract for Japanese Patent No. JP2002343381, Publication Date: Nov. 29, 2002, 1 page.
esp@cenet database, English Abstract for Japanese Patent No. JP2003217340, Publication Date: Jul. 31, 2003, 1 page.

* cited by examiner

Primary Examiner—Patrick Ryan
Assistant Examiner—Muhammad Siddiquee
(74) Attorney, Agent, or Firm—Birch, Stewart, Kolasch & Birch, LLP

(57) ABSTRACT

An ion-conductive electrolyte which comprises a compound having in the molecule a structure represented by the following chemical formula and an electrolyte salt; and a cell employing the ion-conductive electrolyte. The ion-conductive electrolyte has a low vapor pressure, has a high ion conductivity even at room temperature, and has a high lithium ion transport number. With this ion-conductive electrolyte, a highly safe cell having excellent discharge characteristics can be provided.

18 Claims, No Drawings

ION-CONDUCTIVE ELECTROLYTE AND CELL EMPLOYING THE SAME

TECHNICAL FIELD

The present invention relates to an ion-conducting electrolyte and a battery using the same. More specifically, the present invention relates to an ion-conducting electrolyte having a low vapor pressure, a high ionic conductivity even at room temperature and a high lithium-ion transport number, and a battery using the same, which has a high level of safety and excellent discharge characteristics and, especially when it is formed into a secondary battery, achieves excellent charge-discharge characteristics.

BACKGROUND ART

Since lithium-ion secondary batteries have a high energy density, they have been used widely as a power source for portable equipment. However, an electrolyte in the conventional lithium-ion secondary batteries is prepared by dissolving an electrolyte salt such as an alkali metal salt into a carbonate-type solvent with a low boiling point. Because of this low boiling point of the carbonate-type solvent used as the solvent for the electrolyte, the electrolyte has a high vapor pressure, which tends to cause battery swelling during storage and dangerous leakage, posing problems in safety and storage characteristics.

Accordingly, for the purpose of lowering the vapor pressure, JP 2(1990)-34660 A, for example, suggests that a mixture of a crosslinked polymer having a structural unit of a random copolymer of ethylene oxide and propylene oxide, an uncrosslinked random copolymer having a structural unit similar to the above and an alkali electrolyte salt should be used as the electrolyte.

Although the above-mentioned electrolyte using the polymer based on ethylene oxide and propylene oxide has a high boiling point and a low vapor pressure and is effective in improving the battery safety, there still has been a problem of low lithium-ion transport number. For example, as to ether oxygen such as ethylene oxide and propylene oxide, 4 to 6 ether oxygen atoms coordinate with one lithium ion so as to dissociate a lithium electrolyte salt. Since such a lithium ion coordinated by ether oxygen atoms is prevented from moving to a greater degree compared with a counter anion coordinated by no ether oxygen atoms, the lithium-ion transport number lowers. In other words, even though the apparent ionic conductivity is high, the lithium-ion transport number is less than 0.2 at maximum and lower than the lithium-ion transport number of a carbonate-type solvent (0.2 to 0.3).

In the case where the electrolyte has a low lithium-ion transport number as described above, polarization tends to occur. Thus, when the electrolyte is used in a battery, an IR drop increases, leading to a problem that a large electric current cannot be generated.

Accordingly, as a more effective alternative for improving the safety, the use of a polymer electrolyte having an ionic conductivity is considered. Since this polymer electrolyte does not have a vapor pressure in a working temperature range of a battery and can be formed into a sheet, it becomes possible to produce a thin battery having a large area such as an A4 size or a B5 size. A polymer electrolyte battery using this electrolyte can be made into a thin and flexible battery having excellent safety and storage characteristics including leakage resistance, so that it has characteristics exceeding other batteries in that a battery conforming to the shape of equipment can be designed. Thus, the usable range of the battery can be expanded greatly; for example, the battery becomes applicable to various thin electric appliances.

The above-described polymer electrolyte usually is formed by mixing an electrolyte salt of an alkali metal uniformly into a base polymer. Conventionally, electrolytes using various polymers as this base polymer have been suggested. For example, JP 61(1986)-83249 A suggests a battery using a polymer electrolyte composition obtained by dissolving a lithium salt into polyether such as polyethylene oxide or polypropylene oxide or compositions thereof.

Further, as the polymer electrolyte, a polymer electrolyte and a gel electrolyte using a polymer having a carbonate group in its molecule are suggested in JP 62(1987)-30147 A, for example.

However, these polymer electrolytes have an extremely low ionic conductivity ($\sigma = 10^{-5}$ S/cm or lower) around room temperature and fall short of the practical level. This is because a high crystallinity of the polymers used therein limits the molecule motion around room temperature, thus lowering the mobility of ions serving as a dominant factor of ion conduction. Therefore, batteries using these polymer electrolytes can be charged and discharged only at a high temperature of 60° C. or more and used in a greatly limited range at present.

In order to solve the above problem, various attempts have been made to lower the crystallinity of polyether, which is a typical base polymer of a polymer electrolyte. For example, Macromolecules, 32, (1999), p. 1541 reports that, for lowering the crystallinity of an ethylene oxide chain, an improvement of crosslinking or greatly branching polyether can achieve an ionic conductivity on the order of $10^{-4}$ S/cm.

However, such attempts have not yet overcome the intrinsic disadvantage of a low lithium-ion transport number of the polymer electrolyte using polyether. In other words, the lithium-ion transport number is lower than 0.2 at the highest and lower than the lithium-ion transport number of a liquid ion-conducting electrolyte (0.2 to 0.3).

As described above, an ion-conducting electrolyte having a low vapor pressure, a high ionic conductivity even at room temperature and a high lithium-ion transport number has not yet been developed. Accordingly, a battery having a high level of safety and excellent discharge characteristics has not yet been achieved.

DISCLOSURE OF INVENTION

The present invention solves the problems of the conventional ion-conducting electrolyte described above and provides an ion-conducting electrolyte having a low vapor pressure, a high ionic conductivity even at room temperature and a high lithium-ion transport number, and by using this ion-conducting electrolyte, provides a battery that has a high level of safety and excellent discharge characteristics.

The present invention provides an ion-conducting electrolyte containing a chemical compound whose molecule has a structure represented by the chemical formula (1) below, and an electrolyte salt.

Also, the present invention provides a battery including a positive electrode, a negative electrode, and an electrolyte arranged between the positive electrode and the negative electrode. The electrolyte is an ion-conducting electrolyte containing a chemical compound whose molecule has a structure represented by the chemical formula (1) below, and an electrolyte salt.

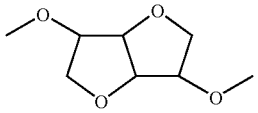

(1)

BEST MODE FOR CARRYING OUT THE INVENTION

The following is a specific description of the reason that the ion-conducting electrolyte of the present invention has the above-described characteristics, and preferred embodiments of the ion-conducting electrolyte of the present invention and the battery using the same.

In the ion-conducting electrolyte of the present invention, the molecule of a chemical compound serving as its base contains a structure represented by the chemical formula (1) below.

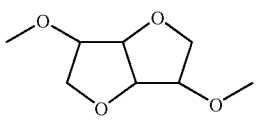

(1)

The structure represented by this chemical formula (1) is polarized suitably, and oxygen in the structure suitably coordinates with a lithium ion so as to accelerate the dissociation of the electrolyte salt mixed therein. At this time, a large number of, i.e., four or more ether oxygens such as ethylene oxide and propylene oxide do not coordinate with the lithium ion to prevent the lithium ion from moving. Thus, the lithium-ion transport number does not lower greatly, either.

Also, the structure represented by the chemical formula (1) is bulky and has a five-membered ring that is not planar but twisted. Thus, the presence of this structure represented by the chemical formula (1) in the polymer effectively disturbs the regularity of the polymer chain so as to lower the polymer crystallinity. Further, the free volume occupied by the polymer chain is increased effectively, leading to a higher motility of the polymer. As a result, a lithium-ion conductivity improves.

It is preferable that the chemical compound whose molecule has the structure represented by the chemical formula (1) above is a chemical compound whose molecule has a structure represented by the chemical formula (2) below.

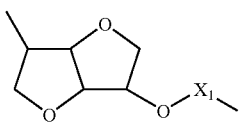

(2)

(where $X_1$ is one selected from the group consisting of

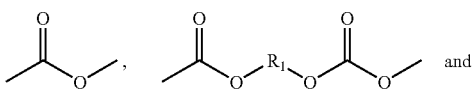

and

-continued

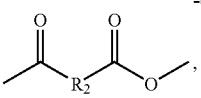

and $R_1$ and $R_2$ are one selected from the group consisting of hydrocarbon chains having 1 to 20 carbon atoms and oligoether chains having 1 to 10 units.)

In the entire chemical compound, $X_1$ may be any one of them or contain two or more of them.

The chemical compound whose molecule has the structure represented by the chemical formula (2) contains a carbonyl group in its molecule as shown by $X_1$ in the chemical formula (2). Since this carbonyl group imparts a polarity to the chemical compound, it becomes possible to dissolve the electrolyte salt in a high concentration. Furthermore, the structure represented by the chemical formula (2) has the carbonyl group in its molecule and has an excellent affinity with carbonate-type solvents, which are used generally in electrolytes of lithium ion secondary batteries. Therefore, even when these solvents are mixed together for enhancing ion conduction, it is possible to provide an ion-conducting electrolyte that has an excellent compatibility, is uniform and involves no phase separation.

It is preferable that the chemical compound whose molecule has the structure represented by the chemical formula (1) above is a chemical compound having a structure represented by the chemical formula (3) below and a structure represented by the chemical formula (4) below in a single molecule.

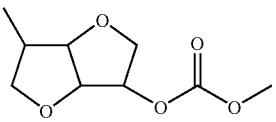

(3)

(4)

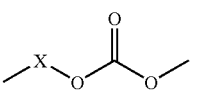

(where X is one selected from the group consisting of hydrocarbon chains having 1 to 20 carbon atoms and oligoether chains having 1 to 10 units.)

In the structure represented by this chemical formula (3), the structure represented by the chemical formula (2) and a carbonate group are bonded to each other, so that an electron withdrawing effect of a carbonyl group contained in the carbonate group decreases an electron donating property of α-oxygen or oxygen on a five-membered ring. Accordingly, an interaction with lithium ions suitably is weakened, and the motility of the lithium ions is not prevented, so that the lithium-ion transport number does not lower greatly.

Further, since the presence of the structure represented by the chemical formula (3) and the structure represented by the chemical formula (4) in a single molecule allows the hydrocarbon chains or the oligoether chains in the chemical formula (4) to impart flexibility to the molecule, the molecule motility increases. Especially when the chemical compound having the structure represented by the chemical formula (3) and the structure represented by the chemical formula (4) in a single molecule has a high molecular weight, the structure represented by the chemical formula (3) inhibits the polymer crystallinity and imparts flexibility to the polymer, so that the ionic conductivity rises.

Further, the chemical compound having the structure represented by the chemical formula (3) and the structure represented by the chemical formula (4) in a single molecule has a molecular weight as large as 200 or more and a high boiling point, and thus has an extremely low vapor pressure.

Moreover, it is preferable that the chemical compound whose molecule has the structure represented by the chemical formula (1) is a chemical compound having a structure represented by the chemical formula (5) below.

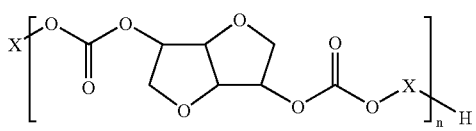

(5)

(where X is one selected from the group consisting of hydrocarbon chains having 1 to 20 carbon atoms and oligoether chains having 1 to 10 units, and n is an integer satisfying $1 \leq n \leq 1000$.)

In other words, in the chemical compound having the structure represented by the chemical formula (5), the structure represented by the chemical formula (3) and the structure represented by the chemical formula (4) are aligned uniformly in a single molecule. Therefore, it is more likely to achieve a high ionic conductivity and provide a uniform ion-conducting electrolyte with no phase separation.

Also, the chemical compound having the structure represented by the chemical formula (5) has a molecular weight as large as 200 or more and a high boiling point, and thus has an extremely low vapor pressure.

As noted above, X in the chemical formula (4) and X in the chemical formula (5) are one selected from the group consisting of hydrocarbon chains having 1 to 20 carbon atoms and oligoether chains having 1 to 10 units. The hydrocarbon chains are set to have 1 to 20 carbon atoms because one or more carbon atoms in the hydrocarbon chain impart flexibility to the polymer so as to improve the ionic conductivity and not greater than 20 carbon atoms therein ensure the affinity to the electrolyte salt to be mixed therein. It is particularly preferable that this hydrocarbon chain has 4 to 10 carbon atoms.

Examples of the oligoether chains having 1 to 10 units represented by X include an oligoethylene oxide chain, an oligopropylene oxide chain, an oligoehylene-propylene oxide chain and an oligothioether chain. The number of units in these oligoether chains is set to 1 to 10 because one or more units of the oligoether chain impart flexibility to the polymer so as to improve the ionic conductivity and not greater than 10 units therein ensure a high lithium-ion transport number. It is particularly preferable that this oligoether chain has 1 to 5 units.

The chemical compound whose molecule has the structure represented by the chemical formula (1) can be obtained by a transesterification condensation reaction between a chemical compound containing two or more carbonic esters that have the structure represented by the chemical formula (1) above and are capable of reacting with a hydroxyl group and a chemical compound containing one or more hydroxyl groups.

The above-mentioned chemical compound containing two or more carbonic esters that have the structure represented by the chemical formula (1) and are capable of reacting with a hydroxyl group is represented by the chemical formula (6) below. As to the above-mentioned chemical compound containing one or more hydroxyl groups, the chemical compound containing one hydroxyl group is represented by the chemical formula (7) below, and the chemical compound containing two or more hydroxyl groups is represented by the chemical formula (8) below. Incidentally, X in the chemical formula (7) and X in the chemical formula (8) are similar to that in the chemical formula (4) above.

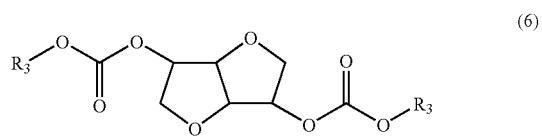

(6)

(where $R_3$ is one selected from the group consisting of a phenyl group, an ethyl group and a propyl group.)

HO—X (7)

HO—X—OH (8)

The transesterification condensation reaction between the chemical compound containing two or more carbonic esters that have the structure represented by the chemical formula (1) above and are capable of reacting with a hydroxyl group (namely, the chemical compound represented by the chemical formula (6)) and the chemical compound containing two or more hydroxyl groups (namely, the chemical compound represented by the chemical formula (8)) is as follows.

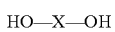

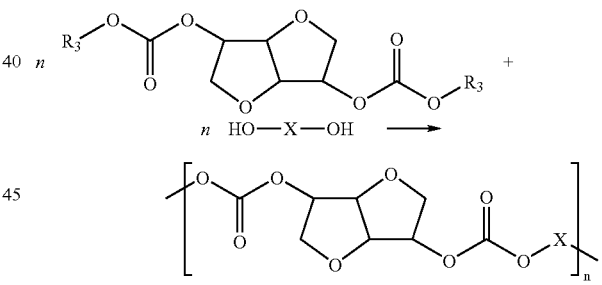

The transesterification condensation reaction between the chemical compound containing two or more carbonic esters that have the structure represented by the chemical formula (1) above and are capable of reacting with a hydroxyl group (namely, the chemical compound represented by the chemical formula (6)) and the chemical compound containing one hydroxyl group (namely, the chemical compound represented by the chemical formula (7)) is as follows.

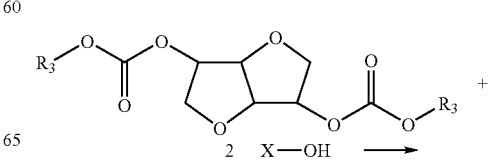

-continued

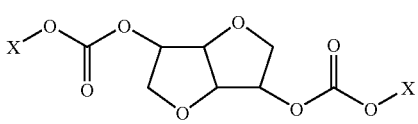 (5)

The chemical compound containing two or more carbonic esters that have the structure represented by the chemical formula (1) above and are capable of reacting with a hydroxyl group (namely, the chemical compound represented by the chemical formula (6)) can be obtained by a reaction of the chemical compound that has the structure represented by the chemical formula (1) and two or more hydroxyl groups with a chloroformic compound of an amount equivalent to the above-noted hydroxyl group, for example. Examples of this chemical compound that has the structure represented by the chemical formula (1) and two or more hydroxyl groups include 1,4:3,6-dianhydro-D-glucitol, 1,4:3,6-dianhydro-D-mannitol and 1,4:3,6-dianhydro-L-iditol.

The structural formula of the above-mentioned 1,4:3,6-dianhydro-D-glucitol is as follows,

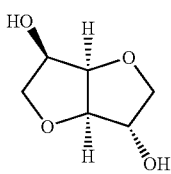

the structural formula of the above-mentioned 1,4:3,6-dianhydro-D-mannitol is as follows,

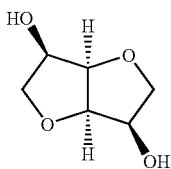

and the structural formula of the above-mentioned 1,4:3,6-dianhydro-L-iditol is as follows.

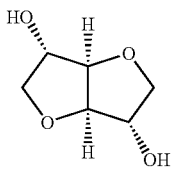

The above-mentioned chemical compound that has the structure represented by the chemical formula (1) and two or more hydroxyl groups is represented by the chemical formula (9) below, and the chloroformic compound to be reacted therewith has a structure represented by the chemical formula (10) below.

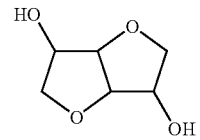 (9)

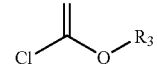 (10)

Further, the following is a reaction formula for obtaining the chemical compound represented by the chemical formula (6) (namely, the chemical compound containing two or more carbonic esters that have the structure represented by the chemical formula (1) and are capable of reacting with a hydroxyl group) from the chemical compound represented by the chemical formula (9) (namely, the chemical compound that has the structure represented by the chemical formula (1) and two or more hydroxyl groups) and the chloroformic compound represented by the chemical formula (10).

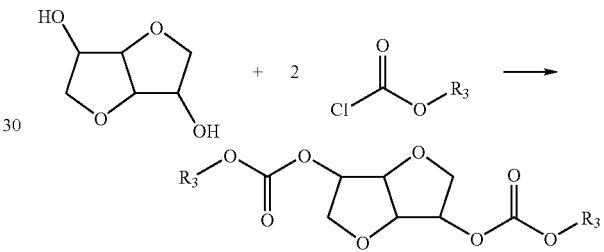

Examples of the chemical compound containing two or more hydroxyl groups represented by the chemical formula (8) include not only chemical compounds containing a hydrocarbon chain whose both ends are provided with hydroxyl groups as noted above but also oligoethers, including an oligoethylene oxide chain, an oligopropylene oxide chain, an oligoethylene-propylene oxide chain and an oligothioethylene chain, whose both ends are provided with hydroxyl groups.

The chemical compounds containing a hydrocarbon chain whose both ends are provided with hydroxyl groups can be, for example, ethylene glycol, 1,3-propanediol, 1,4-butanediol, 1,5-pentanediol, 1,6-hexanediol, 1,7-heptanediol, 1,8-octanediol, 1,9-nonanediol or 1,10-decanediol. The oligoethers whose both ends are provided with hydroxyl groups can be, for example, diethylene glycol, triethylene glycol, tetraethylene glycol, oligoethylene glycol, dipropylene glycol, tripropylene glycol or tetrapropylene glycol.

Examples of the chemical compound containing one hydroxyl group represented by the chemical formula (7) include not only chemical compounds containing a hydrocarbon chain whose one end is provided with a hydroxyl group but also oligoethers, including an oligoethylene oxide chain, an oligopropylene oxide chain, an oligoethylene-propylene oxide chain and an oligothioethylene chain, whose one end is provided with a hydroxyl group.

The chemical compounds containing a hydrocarbon chain whose one end is provided with a hydroxyl group can be, for example, methanol, ethanol, propanol, butanol, pentanol, hexanol, heptanol, octanol, nonanol or decanol. The oligoethers whose one end is provided with a hydroxyl group can be, for example, 2-methoxyethanol, 2-ethoxyethanol, diethylene glycol monomethyl ether, diethylene glycol monoethyl ether, triethylene glycol monomethyl ether, triethylene glycol monoethyl ether, triethylene glycol monoisopropyl ether, tetraethylene glycol monoethyl ether, pentaethylene glycol monomethyl ether or hexaethylene glycol monomethyl ether.

The chemical compound whose molecule has the structure represented by the chemical formula (1) also can be obtained similarly by a transesterification condensation reaction between a chemical compound having the structure represented by the chemical formula (1) and two or more hydroxyl groups and a chemical compound containing one or more carbonic esters that are capable of reacting with a hydroxyl group.

When the chemical compound whose molecule has the structure represented by the chemical formula (1) is a polymer, the ion-conducting electrolyte according to the present invention can be obtained by, for example, dissolving this chemical compound and an electrolyte salt into an organic solvent that allows uniform dissolution such as acetonitrile or tetrahydrofuran, applying this solution to a substrate by casting or spin-coating, removing the organic solvent and then peeling it off from the substrate.

When the chemical compound whose molecule has the structure represented by the chemical formula (1) is liquid, the ion-conducting electrolyte according to the present invention can be obtained by dissolving an electrolyte salt uniformly into this chemical compound.

For preparing the ion-conducting electrolyte according to the present invention, the mixed ratio between the chemical compound whose molecule has the structure represented by the chemical formula (1) and the electrolyte salt preferably is in the range of $0.001 \leq B/A \leq 10$, and more preferably is in the range of $0.001 \leq B/A \leq 2$, where A indicates the number of moles of the structure represented by the chemical formula (1) contained in the chemical compound as a whole and B indicates the number of moles of the electrolyte salt. When the above-noted B/A is less than 0.001, the concentration of the electrolyte salt is low, so that the ionic conductivity is low. On the other hand, when the above-noted B/A exceeds 10, the electrolyte salt above a dissolvable amount precipitates, reducing film uniformity and causing ion association, so that the ionic conductivity also drops.

In order to enhance the ionic conductivity of the above-described ion-conducting electrolyte further, various organic solvents can be mixed. Such organic solvents preferably are carbonate-type solvents used for an electrolyte solution of lithium ion secondary batteries. More specifically, chain carbonates such as dimethyl carbonate, ethylmethyl carbonate, methylpropyl carbonate, methylbutyl carbonate, methylpentyl carbonate, diethyl carbonate, ethylpropyl carbonate, ethylbutyl carbonate and dipropyl carbonate, and cyclic carbonates such as propylene carbonate and ethylene carbonate can be used alone or in combination.

The electrolyte salt used for preparing the ion-conducting electrolyte according to the present invention can be an electrolyte salt of an alkali metal, for example, $MClO_4$ (here and in the following, M is an alkali metal element such as Li, Na, K), $MPF_6$, $MBF_4$, $MAsF_6$, $MSbF_6$, $MCF_3SO_3$, $MCF_3CO_2$, $M_2C_2F_4(SO_3)_2$, $MN(CF_3SO_2)_2$, $MN(C_2F_5SO_2)_2$, $MC(CF_3SO_2)_3$, $MC_nF_{2n+1}SO_3$ ($2 \leq n \leq 3$), $MN(RfOSO_2)_2$ (Rf is a fluoroalkyl group) or MOH. It is particularly preferable to use a salt containing at least Li. These electrolyte salts can be used alone or in combination.

The above description has been directed to the chemical compound whose molecule has the structure represented by the chemical formula (1) as a principal constituent of the ion-conducting electrolyte according to the present invention. However, other components also can be added to the ion-conducting electrolyte according to the present invention as long as they do not impair the property of this electrolyte.

For example, when the chemical compound whose molecule has the structure represented by the chemical formula (1) is a polymer and the ion-conducting electrolyte is solid, various kinds of inorganic fine particles may be added to this ion-conducting electrolyte. This not only improves the strength and the thickness uniformity, but also generates minute openings between the inorganic fine particles and the polymer, thus improving the ionic conductivity and mobility without impairing the strength improvement effect. Also, the addition of the inorganic fine particles rises the viscosity of polymeric compositions, so that the separation of the polymer and the solvent can be suppressed even when they do not have a sufficient compatibility.

The inorganic fine particles used for the above purpose preferably are electrochemically stable inorganic fine particles with no electron conductivity, and more preferably are those with an ionic conductivity. More specifically, ion-conducting or non-ion-conducting ceramic fine particles such as α, β, γ-alumina or silica are preferred.

Specific examples of the inorganic fine particles include ultra-fine silica particles such as Aerosil manufactured by Nippon Aerosil Co., Ltd. and ultra-fine alumina particles, and in particular, ultra-fine alumina particles are preferable in terms of stability and composite efficiency.

Further, when the chemical compound whose molecule has the structure represented by the chemical formula (1) is a polymer, a porous sheet may be used as a support for the ion-conducting electrolyte of the present invention. Such a porous sheet can be, for example, a nonwoven fabric, a microporous film or the like. Examples of the above-noted nonwoven fabric include nonwoven fabrics of polypropylene, polyethylene, polyethylene terephthalate and polybutylene terephthalate, and examples of the above-noted microporous film include microporous films of polypropylene, polyethylene and an ethylene-propylene copolymer.

The ion-conducting electrolyte of the present invention prepared as above can be used as an electrolyte of, for example, organosulfur batteries, lithium batteries such as lithium-manganese batteries, or lithium ion batteries such as lithium-ion secondary batteries. Further, this ion-conducting electrolyte also can be used as an electrolyte of electrochemical capacitors or an electrolyte of ionics elements such as electrochromic displays.

The following is how to produce a battery using the above-described ion-conducting electrolyte. When the ion-conducting electrolyte is liquid, similarly to a usual lithium-ion secondary battery, for example, constituent elements of the battery other than the ion-conducting electrolyte, namely, a positive electrode, a negative electrode, a separator etc., are put in a battery case, and the liquid ion-conducting electrolyte is poured into this battery case and sealed. When the ion-conducting electrolyte is solid, for example, a positive electrode containing an ion-conducting electrolyte, an ion-conducting electrolyte film and a negative electrode containing an ion-conducting electrolyte are made to adhere to each other.

The electrodes containing an ion-conducting electrolyte are produced by, for example, a method including a process of impregnating a positive electrode mixture layer or a negative electrode mixture layer formed on a current collector with a solution in which the ion-conducting electrolyte is dissolved and then removing a solvent, or a method including a process of preparing a paste by adding an active material and, as necessary, a conductive assistant and a binder to a solution in which the ion-conducting electrolyte is dissolved, applying the resultant paste onto a current collector, followed by drying to remove a solvent, as described in detail below.

For example, in the case where the lithium-ion secondary battery is constituted using the ion-conducting electrolyte of the present invention, its positive active material can be one or plural kinds of lithium cobalt oxides such as $LiCoO_2$, lithium manganese oxides such as $LiMn2O_4$, lithium nickel oxides such as $LiNiO_2$, $LiNiCoO_2$ obtained by substituting Co for a part of Ni in $LiNiO_2$, metal oxides such as manganese dioxide, vanadium pentoxide and chromium oxides, and metal sulfide such as titanium disulfide and molybdenum disulfide. Among the above exemplary positive active materials, lithium composite oxides such as $LiNiO_2$, $LiNiCoO_2$ and $LiMn_2O_4$, which show at least 4 V open circuit voltage based on Li at the time of charging, are particularly preferable because high energy density can be achieved.

The positive electrode is produced by adding suitably to the positive active material a conductive assistant such as scaly graphite, carbon black or acetylene black and a binder such as polyvinylidene fluoride or polytetrafluoroethylene as necessary, mixing and preparing a positive electrode mixture and then press-molding this mixture. Alternatively, this positive electrode mixture is dispersed in a solvent so as to prepare a paste containing a positive electrode mixture. Then, this paste is applied to a positive electrode collector formed of an aluminum foil or the like and dried to form a positive electrode mixture layer, followed by a process of rolling as necessary, thus forming the positive electrode. In this case, the binder may be dissolved or dispersed in the solvent before mixed with the positive active material. It should be noted that the method for producing the positive electrode is not limited to the method illustrated above but may be other methods.

The positive electrode containing an ion-conducting electrolyte is produced by, for example, a method including a process of impregnating the positive electrode mixture layer formed on the positive electrode collector as described above with a solution in which the ion-conducting electrolyte is dissolved, and then drying for removing a solvent. As the above-noted positive electrode mixture layer, a positive electrode mixture layer before subjected to rolling is preferable. Here and in the following, the solution in which the ion-conducting electrolyte is dissolved also may be a solution in which a polymer and an electrolyte salt, which are constituents thereof, are dissolved.

Furthermore, the positive electrode containing an ion-conducting electrolyte also can be produced by a method including a process of preparing a positive electrode mixture containing paste containing an ion-conducting electrolyte by mixing a positive active material, a conductive assistant and a binder in a solution in which an ion-conducting electrolyte is dissolved or mixing the above-noted positive electrode mixture containing paste and a solution in which an ion-conducting electrolyte is dissolved, applying this paste to a positive electrode collector, followed by drying to remove a solvent.

The material used for the negative electrode may be a material capable of doping and removing lithium ions, and such a material is referred to as a negative active material in the present invention. Specific examples of this negative active material include graphite, pyrolytic carbons, cokes, glassy carbons, sintered bodies of organic polymer compounds, mesocarbon microbeads, carbon fibers and carbon compounds such as activated carbons. In addition to elemental lithium, alloys of Li with Si, Sn and In, and chemical compounds such as oxides capable of charging/discharging at an electric potential nearly as low as that of lithium (Li) also may be used as the negative active material.

The negative electrode is produced by adding to the negative active material a binder similar to that in the case of the positive electrode as necessary, mixing and preparing a negative electrode mixture and then press-molding this mixture. Alternatively, this negative electrode mixture is dispersed in a solvent so as to prepare a paste containing a negative electrode mixture. Then, this paste is applied to a negative electrode collector formed of a copper foil or the like and dried to form a negative electrode mixture layer, followed by a process of rolling as necessary, thus forming the negative electrode. In this case, the binder may be dissolved or dispersed in the solvent before mixed with the negative active material. It should be noted that the method for producing the negative electrode is not limited to the method illustrated above but may be other methods.

The negative electrode containing an ion-conducting electrolyte is produced by, for example, a method including a process of impregnating the negative electrode mixture layer formed on the negative electrode collector as described above with a solution in which the ion-conducting electrolyte is dissolved, and then drying for removing a solvent. As the above-noted negative electrode mixture layer, a negative electrode mixture layer before subjected to rolling is preferable. Here and in the following, the solution in which the ion-conducting electrolyte is dissolved also may be a solution in which a polymer and an electrolyte salt, which are constituents thereof, are dissolved.

Furthermore, the negative electrode containing an ion-conducting electrolyte also can be produced by a method including a process of preparing a negative electrode mixture containing paste containing an ion-conducting electrolyte by adding and mixing a negative active material and a binder etc. into a solution in which an ion-conducting electrolyte is dissolved or mixing the above-noted negative electrode mixture containing paste and a solution in which an ion-conducting electrolyte is dissolved, applying this paste to a negative electrode collector, followed by drying to remove a solvent.

In the present invention, as the positive electrode collector, an aluminum foil, a punched metal, a net, an expanded metal or the like can be used preferably, for example. In particular, an aluminum foil is preferable. On the other hand, as the negative electrode collector, a copper foil, a punched metal, a net, an expanded metal or the like can be used preferably, for example. In particular, a copper foil is preferable.

The following is a more detailed description of the present invention by way of examples. It should be noted that the present invention is not limited to these examples alone.

EXAMPLE 1

Synthesis of 1,4:3,6-dianhydro-2,5-bis-O-(phenoxy-carbonyl)-D-glucitol

After 58 g 1,4:3,6-dianhydro-D-glucitol, 10 g dried pyridine and 150 $cm^3$ tetrahydrofuran were put in a nitrogen-replaced flask and dissolved uniformly, 17.4 g phenyl chloroformate was allowed to drip into this solution while ice-cooling and stirring the solution. After dripping, the temperature was brought back to room temperature (20° C.), and the solution was stirred for 60 hours. The solution that had undergone reaction was allowed to drip into water so as to precipitate solid substances, which were then filtered and washed several times with 5% by mass sodium hydrogencarbonate aqueous solution and distilled water, thus obtaining white solid substances. These white solid substances were purified by being dissolved in ethyl acetate and then recrystalized therefrom, thus obtaining 1,4:3,6-dianhydro-2,5-bis-O-(phenoxycarbonyl)-D-glucitol.

Synthesis of Polymer

In a test tube, zinc acetate was added in the ratio of 2.5 mol % with respect to 97.5 mol % 1,4:3,6-dianhydro-2,5-bis-O-(phenoxycarbonyl)-D-glucitol that had been synthesized by the above-described method. A three-way cock and an eliminated phenol removing device provided with a cooling tube were attached to the test tube and dried in vacuum, followed by nitrogen replacement. Then, the equivalent weight of 1,6-hexanediol was added thereto and heated to 190° C. while being stirred at a normal pressure. Thereafter, heating at a reduced pressure and heating at a pressure reduced by a vacuum pump were carried out. After the reaction, the obtained product was dissolved in chloroform and allowed to drip into methanol, thus obtaining a precipitate (a polymer). After repeating similar re-precipitation operations several times, vacuum drying was performed. This polymer belonged to a chemical compound whose molecule had the structure represented by the chemical formula (1) and a chemical compound whose molecule had the structure represented by the chemical formula (2) and further belonged to a chemical compound having the structure represented by the chemical formula (3) and the structure represented by the chemical formula (4) in a single molecule. In the chemical formula (4), X was an alkylene chain having 6 carbon atoms.

Thus synthesized polymer and $LiN(SO_2CF_3)_2$ were dissolved in acetonitrile. This solution was cast on a stainless steel plate directly and a polytetrafluoroethylene film attached to a glass plate, and then the acetonitrile was removed at room temperature (20° C.). Further, by vacuum drying for 24 hours, the acetonitrile was removed completely, thus obtaining a 100 μm thick ion-conducting electrolyte film. The amount of $LiN(SO_2CF_3)_2$ added as an electrolyte salt when preparing the above-described ion-conducting electrolyte was such that B/A=0.2 where B was the number of moles thereof and A was the number of moles of the structure represented by the chemical formula (1) contained in the above-noted polymer as a whole.

EXAMPLE 2

An ion-conducting electrolyte film was obtained in a manner similar to Example 1 except that the amount of $LiN(SO_2CF_3)_2$ added as an electrolyte salt in Example 1 was such that B/A=0.4 where B was the number of moles thereof and A was the number of moles of the structure represented by the chemical formula (1) contained in the above-noted polymer as a whole.

EXAMPLE 3

A polymer was synthesized in a manner similar to Example 1 except that 1,6-hexanediol was changed to 1,8-octanediol. This polymer belonged to a chemical compound whose molecule had the structure represented by the chemical formula (1) and a chemical compound whose molecule had the structure represented by the chemical formula (2) and further belonged to a chemical compound having the structure represented by the chemical formula (3) and the structure represented by the chemical formula (4) in a single molecule. In the chemical formula (4), X was an alkylene chain having 8 carbon atoms.

Thus synthesized polymer and $LiN(SO_2CF_3)_2$ were dissolved in tetrahydrofuran. This solution was cast on a stainless steel plate directly and a polytetrafluoroethylene film attached to a glass plate, and then tetrahydrofuran was removed at room temperature. Further, by vacuum drying for 24 hours, tetrahydrofuran was removed completely, thus obtaining a 80 μm thick ion-conducting electrolyte film. The amount of $LiN(SO_2CF_3)_2$ added as an electrolyte salt when preparing the above-described ion-conducting electrolyte was such that B/A=0.2 where B was the number of moles thereof and A was the number of moles of the structure represented by the chemical formula (1) contained in the above-noted polymer as a whole.

EXAMPLE 4

An ion-conducting electrolyte film was obtained in a manner similar to Example 3 except that the amount of $LiN(SO_2CF_3)_2$ added as an electrolyte salt in Example 3 was such that B/A=0.4 where B was the number of moles thereof and A was the number of moles of the structure represented by the chemical formula (1) contained in the above-noted polymer as a whole.

EXAMPLE 5

A polymer was synthesized in a manner similar to Example 1 except that 1,6-hexanediol was changed to 1,10-decanediol. This polymer also belonged to a chemical compound whose molecule had the structure represented by the chemical formula (1) and a chemical compound whose molecule had the structure represented by the chemical formula (2) and further belonged to a chemical compound having the structure represented by the chemical formula (3) and the structure represented by the chemical formula (4) in a single molecule. In the chemical formula (4), X was an alkylene chain having 10 carbon atoms.

Thus synthesized polymer and $LiN(SO_2CF_3)_2$ were dissolved in tetrahydrofuran. This solution was cast on a stainless steel plate directly and a polytetrafluoroethylene film attached to a glass plate, and then tetrahydrofuran was removed at room temperature. Further, by vacuum drying for 24 hours, tetrahydrofuran was removed completely, thus obtaining a 80 μm thick ion-conducting electrolyte film. The amount of $LiN(SO_2CF_3)_2$ added as an electrolyte salt when preparing the above-described ion-conducting electrolyte was such that B/A=0.2 where B was the number of moles thereof and A was the number of moles of the structure represented by the chemical formula (1) contained in the above-noted polymer as a whole.

EXAMPLE 6

An ion-conducting electrolyte film was obtained in a manner similar to Example 5 except that the amount of $LiN(SO_2CF_3)_2$ added as an electrolyte salt in Example 5 was such that B/A=0.4 where B was the number of moles thereof and A was the number of moles of the structure represented by the chemical formula (1) contained in the above-noted polymer as a whole.

EXAMPLE 7

A chemical compound was synthesized in a manner similar to Example 1 except that 1,6-hexanediol was changed to twice as much equivalent weight of octanol. This chemical compound was colorless transparent liquid having a viscosity of 100 cp. This chemical compound also belonged to a chemical compound whose molecule had the structure represented by the chemical formula (1) and a chemical compound whose molecule had the structure represented by the chemical formula (2) and further belonged to a chemical compound having the structure represented by the chemical formula (3) and the structure represented by the chemical formula (4) in a single molecule. Furthermore, this chemical compound also belonged to a chemical compound represented by the chemical formula (5). In the chemical formula (5), X was an alkylene chain having 8 carbon atoms and n was 1.

$LiN(SO_2CF_3)_2$ was dissolved in the chemical compound synthesized as above so as to prepare an ion-conducting electrolyte. The amount of $LiN(SO_2CF_3)_2$ added as an electrolyte salt when preparing the above-described ion-conducting electrolyte was such that B/A=0.2 where B was the number of moles thereof and A was the number of moles of the structure represented by the chemical formula (1) contained in the above-noted chemical compound as a whole.

EXAMPLE 8

A polymer was synthesized in a manner similar to Example 1 except that 1,6-hexanediol was changed to triethylene glycol. This polymer also belonged to a chemical compound whose molecule had the structure represented by the chemical formula (1) and a chemical compound whose molecule had the structure represented by the chemical formula (2) and further belonged to a chemical compound having the structure represented by the chemical formula (3) and the structure represented by the chemical formula (4) in a single molecule. In the chemical formula (4), X was an oligoether chain having 3 units.

Thus synthesized polymer and $LiN(SO_2CF_3)_2$ were dissolved in acetonitrile. This solution was cast on a stainless steel plate directly and a polytetrafluoroethylene film attached to a glass plate, and then the acetonitrile was removed at room temperature. Further, by vacuum drying for 24 hours, the acetonitrile was removed completely, thus obtaining a 80 µm thick ion-conducting electrolyte film. The amount of $LiN(SO_2CF_3)_2$ added as an electrolyte salt when preparing the above-described ion-conducting electrolyte was such that B/A=0.4 where B was the number of moles thereof and A was the number of moles of the structure represented by the chemical formula (1) contained in the above-noted polymer as a whole.

EXAMPLE 9

A polymer was synthesized in a manner similar to Example 1 except that 1,6-hexanediol was changed to tetraethylene glycol. This polymer also belonged to a chemical compound whose molecule had the structure represented by the chemical formula (1) and a chemical compound whose molecule had the structure represented by the chemical formula (2) and further belonged to a chemical compound having the structure represented by the chemical formula (3) and the structure represented by the chemical formula (4) in a single molecule. In the chemical formula (4), X was an oligoether chain having 4 units.

Thus synthesized polymer and $LiN(SO_2CF_3)_2$ were dissolved in acetonitrile. This solution was cast on a stainless steel plate directly and a polytetrafluoroethylene film attached to a glass plate, and then the acetonitrile was removed at room temperature. Further, by vacuum drying for 24 hours, the acetonitrile was removed completely, thus obtaining a 80 µm thick ion-conducting electrolyte film. The amount of $LiN(SO_2CF_3)_2$ added as an electrolyte salt when preparing the above-described ion-conducting electrolyte was such that B/A=0.4 where B was the number of moles thereof and A was the number of moles of the structure represented by the chemical formula (1) contained in the above-noted polymer as a whole.

COMPARATIVE EXAMPLE 1

Polyethylene oxide (number-average molecular weight: 100000) and $LiN(SO_2CF_3)_2$ were dissolved in acetonitrile. This solution was cast on a stainless steel plate directly and a polytetrafluoroethylene film attached to a glass plate, and then the acetonitrile was removed at room temperature. Further, by vacuum drying for 24 hours, the acetonitrile was removed completely, thus obtaining a 70 µm thick ion-conducting electrolyte film. Although the amount of $LiN(SO_2CF_3)_2$ added as an electrolyte salt when preparing the above-described ion-conducting electrolyte cannot be indicated similarly to the cases of Examples 1 to 9 described above because the polymer of Comparative Example 1 does not contain any carbonate group, the total amount of lithium ions in the polymer was such that the mole ratio of lithium ion/polymer unit=0.2.

COMPARATIVE EXAMPLE 2

$LiN(SO_2CF_3)_2$ was dissolved in a carbonate-type solvent prepared by mixing ethylene carbonate and ethylmethyl carbonate in a volume ratio of 1:1, thus obtaining an ion-conducting electrolyte. This ion-conducting electrolyte was liquid and had a lithium ion concentration of 1 $mol/dm^3$.

With respect to the ion-conducting electrolyte films formed in Examples 1 to 6, Examples 8, 9 and Comparative Example 1 and the ion-conducting electrolytes in Example 7 and Comparative Example 2 described above, their ionic conductivity, lithium-ion transport number and mass decrease ratio by thermal analysis were examined. The results are shown in Table 1. The ionic conductivity, the lithium-ion transport number and the mass decrease ratio were measured as follows.

Measurement of Ionic Conductivity

Each of the above-described ion-conducting electrolyte films of Examples 1 to 6, Examples 8, 9 and Comparative Example 1 formed on the stainless steel plate was sandwiched using another stainless steel plate and incorporated altogether into an HS cell manufactured by Hohsen Corporation, thus producing a model cell. On the other hand, a separator "Tonen SETELA E25MMS" (trade name) manufactured by Tonen Corporation was sandwiched by two stainless steel plates and incorporated altogether into the above-mentioned HS cell. Thereafter, each of the ion-conducting electrolytes of Example 7 and Comparative Example 2 was poured into the cell, thus producing a model cell. Then, the ionic conductivities of these ion-conducting electrolytes of Examples 1 to 9 and Comparative Examples 1 and 2 at room temperature (20° C.) were measured by an alternating current impedance method.

Measurement of Lithium-Ion Transport Number

Each of the ion-conducting electrolyte films of Examples 1 to 6, Examples 8, 9 and Comparative Example 1 formed on the polytetrafluoroethylene film was peeled off carefully, sandwiched by two lithium foils and incorporated in the above-mentioned HS cell, thus producing a model cell. On the other hand, the above-mentioned separators "Tonen SETELA E25MMS" were impregnated respectively with the ion-conducting electrolytes of Example 7 and Comparative Example 2. Each of the separators was sandwiched by two lithium foils and incorporated altogether into the above-mentioned HS cell, thus producing a model cell. Then, the lithium-ion transport number was measured by a transport number measuring method, which was a combination of an ionic direct current polarization method and a complex impedance method. Incidentally, this measuring method is introduced in Polymer, 28, 2324 (1987).

In other words, the above-mentioned lithium foils served as electrodes, between which a constant voltage (10 mV) was applied, thus measuring an initial current value ($I_0$) and a stationary current value ($I_s$). Furthermore, an interface resistance measurement value $R_0$ before the voltage application and an interface resistance measurement value $R_s$ after the voltage application were determined by a complex impedance method. Then, the obtained values were substituted into the formula below, thereby calculating a lithium-ion transport number T.

$$T=I_s(\Delta V-I_0R_0)/I_0(\Delta V-I_sR_s)$$

In the above formula, $\Delta V$ indicates an applied voltage.

Measurement of Mass Decrease by Thermal Analysis

Each electrolyte was put in an Al sample pan and heated up at 5° C./min in the range from 0° C. to 300° C. using a differential thermobalance (TG/DTA) "ThermoPlus TG8120" (trade name) manufactured by Rigaku Corporation, so as to examine a mass decrease ratio at 100° C. The mass decrease ratio was measured for evaluating a high-temperature stability of each electrolyte by thermal analysis.

Table 1 shows the results of the measurements.

TABLE 1

| | State | X | B/A | Ionic conductivity (mS/cm) | Lithium-ion transport number | Mass decrease ratio (%) |
|---|---|---|---|---|---|---|
| Example 1 | solid | alkylene chain having 6 carbon atoms | 0.2 | 0.10 | 0.30 | 0 |
| Example 2 | | | 0.4 | 0.21 | 0.28 | 0 |
| Example 3 | solid | alkylene chain having 8 carbon atoms | 0.2 | 0.11 | 0.30 | 0 |
| Example 4 | | | 0.4 | 0.12 | 0.33 | 0 |
| Example 5 | solid | alkylene chain having 10 carbon atoms | 0.2 | 0.08 | 0.31 | 0 |
| Example 6 | | | 0.4 | 0.073 | 0.37 | 0 |
| Example 7 | liquid | alkylene chain having 8 carbon atoms | 0.2 | 1.8 | 0.25 | 5 |
| Example 8 | solid | oligoether chain having 3 units | 0.4 | 0.31 | 0.23 | 0 |
| Example 9 | solid | oligoether chain having 4 units | 0.4 | 0.28 | 0.25 | 0 |
| Comparative Example 1 | solid | — | 0.2 | 0.02 | 0.13 | 0 |
| Comparative Example 2 | liquid | — | — | 5.00 | 0.20 | 50 |

From the results shown in Table 1, the ion-conducting electrolytes of Examples 1 to 6 and Examples 8 and 9 and the ion-conducting electrolyte of 5 Comparative Example 1, which were solid (polymer-type) ion-conducting electrolytes, were compared. The ion-conducting electrolytes of Examples 1 to 6 and Examples 8 and 9 showed a higher ionic conductivity and a higher lithium-ion transport number than the ion-conducting electrolyte of Comparative Example 1. In other words, the ion-conducting electrolytes of Examples 1 to 6 and Examples 8 and 9 had a high ionic conductivity and a high lithium-ion transport number even at room temperature. Further, similarly to the ion-conducting electrolyte of Comparative Example 1, the ion-conducting electrolytes of Examples 1 to 6 and Examples 8 and 9 showed no decrease in mass, namely, an excellent thermal stability also in the high-temperature stability evaluation by thermal analysis.

In contrast, the ion-conducting electrolyte of Comparative Example 2, which was a liquid ion-conducting electrolyte, had a large mass decrease ratio at a high temperature, a high vapor pressure and thus a poor level of safety, though it had a high ionic conductivity. With respect to the ion-conducting electrolyte of Example 7, which was a liquid ion-conducting electrolyte as the ion-conducting electrolyte of Comparative Example 2, although there was a slight decrease in mass at a high temperature unlike the solid (polymer-type) ion-conducting electrolytes, the mass decrease value was 1/10 that of the ion-conducting electrolyte of Comparative Example 2. Thus, the ion-conducting electrolyte of Example 7 had a lower vapor pressure, a more excellent thermal stability and thus a higher level of safety than the ion-conducting electrolyte of Comparative Example 2.

Next, lithium ion secondary batteries of Example 10, Example 11 and Comparative Example 3 were produced using the above-described ion-conducting electrolytes of Example 1 and Comparative Example 1, and discharge characteristics and charge-discharge characteristics thereof were examined.

EXAMPLE 10

85 parts by mass LiCoO$_2$ as a positive active material, 10 parts by mass acetylene black as a conductive assistant and 5 parts by mass polyvinylidene fluoride as a binder were mixed uniformly with N-methyl-2-pyrrolidone as a solvent, thus preparing a positive electrode mixture containing paste. The obtained positive electrode mixture containing paste was applied to one surface of a positive electrode collector formed of a 20 µm thick aluminum foil, and heated and dried to remove the N-methyl-2-pyrrolidone, thus forming a positive electrode mixture layer. In this manner, a positive electrode sheet was produced.

Also, in a dry atmosphere, 0.3 g condensate of 1,4:3,6-dianhydro-2,5-bis-O— (phenoxycarbonyl-D-glucitol and 1,6-hexanediol (hereinafter, referred to as "PGm6"), which was the polymer synthesized in Example 1, and 0.25 g LiN(SO$_2$CF$_3$)$_2$ (hereinafter, referred to as "LiTFSI") were heated and dissolved in 1 g propylene carbonate as a solvent, thus preparing an ion-conducting electrolyte solution. In this ion-conducting electrolyte solution, B/A=0.2 where A was the number of moles of the structure represented by the chemical formula (1) contained in PGm6 as a whole and B was the number of moles of LiTFSI.

Similarly to the above, in a dry atmosphere, the above-described ion-conducting electrolyte solution was applied to the positive electrode sheet of the positive electrode mixture layer over a hot plate at 80° C., immediately followed by a vacuum impregnation at 80° C. for 1 hour. Thereafter, a vacuum drying was performed at 120° C. for 12 hours so as to remove the propylene carbonate. The dried electrode body was subjected to calendering, thereby making a thickness adjustment to achieve a total thickness of 50 μm. Subsequently, the electrode body was punched out into a circular shape so that the area of the portion forming the positive electrode mixture layer was 1 cm², thus obtaining an ion-conducting electrolyte containing positive electrode.

Between the ion-conducting electrolyte containing positive electrode produced as above and a negative electrode formed of a lithium foil punched out into a circular shape so as to have an area of 1.2 cm², the 100 μm thick ion-conducting electrolyte film produced in Example 1 was sandwiched, and the positive electrode and the negative electrode were adhered to each other. The obtained body was incorporated into an HS cell manufactured by Hohsen Corporation, thus assembling a 2.5 mAh lithium ion secondary battery.

EXAMPLE 11

1.8 g LiCoO₂ as a positive active material, 0.1 g acetylene black as a conductive assistant, 0.1 g polyvinylidene fluoride as a binder, 0.3 g PGm6 synthesized in Example 1 and 0.25 g LiTFSI were mixed uniformly with 3 g N-methyl-2-pyrrolidone as a solvent in a dry atmosphere, thus preparing a positive electrode mixture containing paste containing an ion-conducting electrolyte.

The obtained positive electrode mixture containing paste containing an ion-conducting electrolyte was applied to one surface of a positive electrode collector formed of a 20 μm thick aluminum foil in a dry atmosphere, and heated and dried to remove the N-methyl-2-pyrrolidone, thus forming an ion-conducting electrolyte containing positive electrode mixture layer. In this manner, an ion-conducting electrolyte containing positive electrode sheet was produced. This ion-conducting electrolyte containing positive electrode sheet was subjected to calendering, thereby making a thickness adjustment to achieve a total thickness of 50 μm. Subsequently, the positive electrode sheet was punched out into a circular shape so that the area of the portion forming the positive electrode mixture layer was 1 cm², thus obtaining an ion-conducting electrolyte containing positive electrode.

Between the ion-conducting electrolyte containing positive electrode produced as above and a negative electrode formed of a lithium foil punched out into a circular shape so as to have an area of 1.2 cm², the 100 μm thick ion-conducting electrolyte film produced in Example 1 was sandwiched, and the positive electrode and the negative electrode were adhered to each other. The obtained body was incorporated into the above-mentioned HS cell, thus assembling a 2.5 mAh lithium ion secondary battery.

COMPARATIVE EXAMPLE 3

85 parts by mass LiCoO₂ as a positive active material, 10 parts by mass acetylene black as a conductive assistant and 5 parts by mass polyvinylidene fluoride as a binder were mixed uniformly with N-methyl-2-pyrrolidone as a solvent, thus preparing a positive electrode mixture containing paste. The obtained positive electrode mixture containing paste was applied to one surface of a positive electrode collector formed of a 20 μm thick aluminum foil, and heated and dried to remove the N-methyl-2-pyrrolidone, thus forming a positive electrode mixture layer. In this manner, a positive electrode sheet was produced.

Also, in a dry atmosphere, 0.3 g polyethylene oxide (number-average molecular weight: 100000; hereinafter, referred to as "PEO") and 0.25 g LiTFSI used in Comparative Example 1 were heated and dissolved in 1 g propylene carbonate as a solvent, thus preparing an ion-conducting electrolyte solution.

Next, similarly to the above, in a dry atmosphere, the above-described ion-conducting electrolyte solution was applied to the positive electrode sheet of the positive electrode mixture layer over a hot plate at 80° C., immediately followed by a vacuum impregnation at 80° C. for 1 hour. Thereafter, a vacuum drying was performed at 120° C. for 12 hours so as to remove the propylene carbonate. The dried electrode body was subjected to calendering, thereby making a thickness adjustment to achieve a total thickness of 50 μm. Subsequently, the electrode body was punched out into a circular shape so that the area of the portion forming the positive electrode mixture layer was 1 cm², thus obtaining an ion-conducting electrolyte containing positive electrode.

Between the ion-conducting electrolyte containing positive electrode produced as above and a negative electrode formed of a lithium foil punched out into a circular shape so as to have an area of 1.2 cm², the 70 μm thick ion-conducting electrolyte film produced in Comparative Example 1 was sandwiched, and the positive electrode and the negative electrode were adhered to each other. The obtained body was incorporated into the above-mentioned HS cell, thus assembling a 2.5 mAh lithium ion secondary battery.

The batteries of Examples 10 and 11 and the battery of Comparative Example 3 obtained as above were discharged down to 3.0 V at room temperature (20° C.) at a discharge current of 0.05 C, and the discharge capacities thereof were measured. Also, the batteries of Examples 10, 11 and Comparative Example 3 were discharged down to 3.0 V at room temperature (20° C.) at a discharge current of 0.1 C, and the discharge capacities thereof were measured. The ratio of the discharge capacity in the case of discharging at 0.1 C to that in the case of discharging at 0.05 C was calculated by the formula below. The results are shown as load characteristics in Table 2.

Load characteristics (%)=(Discharge capacity in the case of discharging at 0.1 C/Discharge capacity in the case of discharging at 0.05 C)×100

Furthermore, the batteries of Examples 10, 11 and Comparative Example 3 were charged up to 4.3 V at a charge current of 0.05 C and discharged down to 3.0 V at a discharge current of 0.05 C. A cycle consisting of these charging and discharging was repeated, and the capacity retention ratio after 10 cycles, namely, the ratio of a discharge capacity after 10 cycles to an initial discharge capacity was examined. Table 2 shows the results.

TABLE 2

| | Polymer | Load characteristics (%) | Capacity retention ratio after 10 cyces (%) |
| --- | --- | --- | --- |
| Example 10 | PGm6 | 62 | 85 |
| Example 11 | PGm6 | 76 | 82 |
| Comparative Example 3 | PEO | 50 | 75 |

As shown in Table 2, the batteries of Examples 10 and 11 had higher load characteristics and thus more excellent discharge characteristics as well as a higher capacity retention ratio after 10 cycles and thus more excellent charge-discharge characteristics than the battery of Comparative Example 3.

INDUSTRIAL APPLICABILITY

As described above, according the present invention, it is possible to provide an ion-conducting electrolyte having a low vapor pressure, a high ionic conductivity even at room temperature and a high lithium-ion transport number. Also, by using this ion-conducting electrolyte, it is possible to provide a battery that has a high level of safety and excellent discharge characteristics and, particularly in the case of a secondary battery, excellent charge-discharge characteristics.

The invention claimed is:

1. An ion-conducting electrolyte comprising:
a chemical compound whose molecule has a structure represented by the chemical formula (1) below; and
an electrolyte salt containing Li

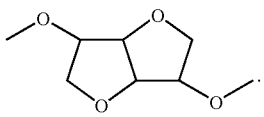
(1)

2. The ion-conducting electrolyte according to claim 1, wherein the chemical compound whose molecule has the structure represented by the chemical formula (1) has in its molecule a structure represented by the chemical formula (2) below

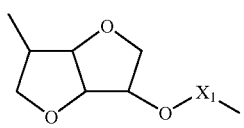
(2)

(where $X_1$ is one selected from the group consisting of

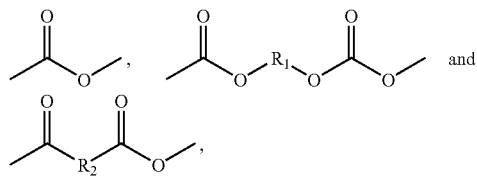
and and $R_1$ and $R_2$ are one selected from the group consisting of hydrocarbon chains having 1 to 20 carbon atoms and oligoether chains having 1 to 10 units).

3. The ion-conducting electrolyte according to claim 1, wherein the chemical compound whose molecule has the structure represented by the chemical formula (1) has a structure represented by the chemical formula (3) below and a structure represented by the chemical formula (4) below in a single molecule

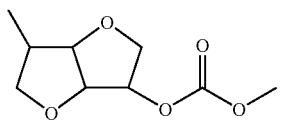
(3)

-continued

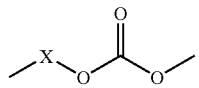
(4)

(where X is one selected from the group consisting of hydrocarbon chains having 1 to 20 carbon atoms and oligoether chains having 1 to 10 units).

4. The ion-conducting electrolyte according to claim 1, wherein the chemical compound whose molecule has the structure represented by the chemical formula (1) has a structure represented by the chemical formula (5) below

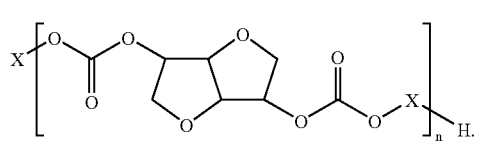
(5)

5. The ion-conducting electrolyte according to claim 1, wherein $0.001 \leq B/A \leq 10$, where A indicates the number of moles of the structure represented by the chemical formula (1) contained in the chemical compound as a whole and B indicates the number of moles of the electrolyte salt.

6. The ion-conducting electrolyte according to claim 1, wherein the electrolyte salt is at least one selected from the group consisting of $MClO_4$ (here and in the following, M is an alkali metal element and contains at least Li), $MPF_6$, $MBF_4$, $MAsF_6$, $MSbF_6$, $MCF_3SO_3$, $MCF_3CO_2$, $M_2C_2F_4(SO_3)_2$, $MN(CF_3SO_2)_2$, $MN(C_2F_5SO_2)_2$, $MC(CF_3SO_2)_3$, $MC_nF_{2n+1}SO_3$ ($n \geq 2$), $MN(RfOSO_2)_2$ (Rf is a fluoroalkyl group) and MOH.

7. The ion-conducting electrolyte according to claim 1, wherein the chemical compound whose molecule has the structure represented by the chemical formula (1) is obtained by a condensation reaction between a chemical compound containing two or more carbonic esters that have the structure represented by the chemical formula (1) and are capable of reacting with a hydroxyl group and a chemical compound containing one or more hydroxyl groups.

8. A battery comprising:
a positive electrode;
a negative electrode; and
an electrolyte arranged between the positive electrode and the negative electrode;
wherein the electrolyte is an ion-conducting electrolyte comprising a chemical compound whose molecule has a structure represented by the chemical formula (1) below, and an electrolyte salt containing Li

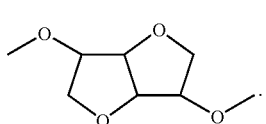
(1)

9. The battery according to claim 8, wherein the chemical compound whose molecule has the structure represented by the chemical formula (1) has in its molecule a structure represented by the chemical formula (2) below

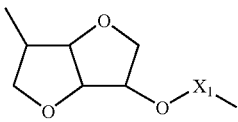
(2)

(where $X_1$ is one selected from the group consisting of

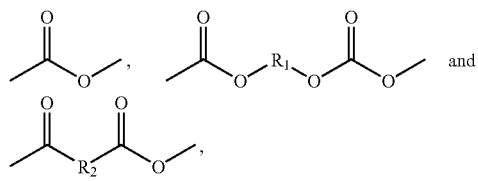

and $R_1$ and $R_1$ are one selected from the group consisting of hydrocarbon chains having 1 to 20 carbon atoms and oligoether chains having 1 to 10 units).

10. The battery according to claim 8, wherein the chemical compound whose molecule has the structure represented by The chemical formula (1) has a structure represented by The chemical formula (3) below and a structure represented by the chemical formula (4) below in a single molecule

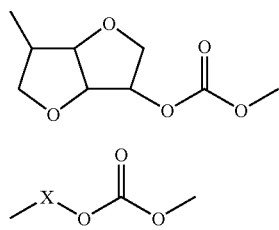
(3)
(4)

(where X is one selected from the group consisting of hydrocarbon chains having 1 to 20 carbon atoms and oligoether chains having 1 to 10 units).

11. The battery according to claim 8, wherein the chemical compound whose molecule has the structure represented by the chemical formula (1) has a structure represented by the chemical formula (5) below

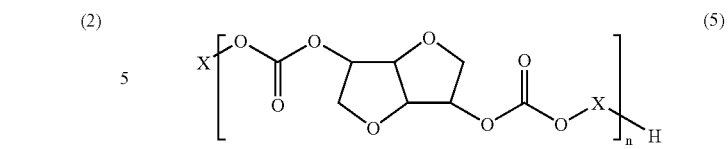
(5)

(where X is one selected from the group consisting of hydrocarbon chains having 1 to 20 carbon atoms and oligoether chains having 1 to 10 units, and n is an integer equal to or larger than 1).

12. The battery according to claim 8, wherein $0.001 \leq B/A \leq 10$, where A indicates the number of moles of the structure represented by the chemical formula (1) contained in the chemical compound as a whole and B indicates the number of moles of the electrolyte salt.

13. The battery according to claim 8, wherein the electrolyte salt is at least one selected from the group consisting of $MClO_4$ (here and in the following, M is an alkali metal element and contains at least Li), $MPF_6$, $MBF_4$, $MAsF_6$, $MSbF_6$, $MCF_3SO_3$, $MCF_3CO_2$, $M_2C_2F_4(SO_3)_2$, $MN(CF_3SO_2)$, $MN(C_2F_5SO_2)_2$, $MC(CF_3SO_2)_3$, $MC_nF_{2n+1}SO_3$ ($n \geq 2$), $MN(RfOSO_2)_2$ (Rf is a fluoroalkyl group) and MOH.

14. The battery according to claim 8, wherein the chemical compound whose molecule has the structure represented by the chemical formula (1) is obtained by a condensation reaction between a chemical compound containing two or more carbonic esters that have the structure represented by the chemical formula (1) and are capable of reacting with a hydroxyl group and a chemical compound containing one or more hydroxyl groups.

15. The ion-conducting electrolyte according to claim 1, further comprising a solvent,
wherein the solvent contains a carbonate.

16. The ion-conducting electrolyte according to claim 1, wherein the chemical compound whose molecule has the structure represented by the chemical formula (1) is a polymer.

17. The battery according to claim 8, wherein the electrolyte further comprises a solvent, and the solvent contains a carbonate.

18. The battery according to claim 8, wherein the chemical compound whose molecule has the structure represented by the chemical formula (1) is a polymer.

* * * * *